(12) United States Patent
Leeb

(10) Patent No.: US 6,466,727 B1
(45) Date of Patent: Oct. 15, 2002

(54) HOLDERS FOR WIRES, SUCH AS FIBER OPTIC WIRES

(76) Inventor: Melvyn J. Leeb, 2316 Velvet Ridge Dr., Owings Mills, MD (US) 21117

( * ) Notice: Subject to any disclaimer, the term of this patent is extended or adjusted under 35 U.S.C. 154(b) by 0 days.

(21) Appl. No.: 09/922,116

(22) Filed: Aug. 3, 2001

(51) Int. Cl.[7] .................................................. G02B 6/00
(52) U.S. Cl. ........................................ 385/137; 174/135
(58) Field of Search ................................ 385/137, 147; 439/86; 174/135, 136

(56) References Cited

U.S. PATENT DOCUMENTS

| | | | | |
|---|---|---|---|---|
| 2,579,974 A | | 12/1951 | Scott et al. ................. 229/43 |
| D234,246 S | | 2/1975 | Martini ..................... D8/259 |
| 4,581,481 A | * | 4/1986 | Moretti ..................... 16/109 |
| 4,609,171 A | | 9/1986 | Matsui ..................... 248/74.3 |
| D318,123 S | | 7/1991 | Yokoyama et al. ......... D24/129 |
| D347,384 S | | 5/1994 | White et al. ................. D8/395 |
| 5,618,015 A | | 4/1997 | Morini ..................... 248/74.2 |
| 5,626,316 A | * | 5/1997 | Smigel et al. ............. 248/68.1 |
| 5,675,128 A | * | 10/1997 | Simon ........................ 174/135 |

* cited by examiner

Primary Examiner—Tulsidas Patel
(74) Attorney, Agent, or Firm—Leonard Bloom; Robert M. Gamson

(57) ABSTRACT

A unitary member is molded (preferably from a conductive silicone material) to form a holder or clip for retaining fiber optic wires. Two embodiments are disclosed.

14 Claims, 4 Drawing Sheets

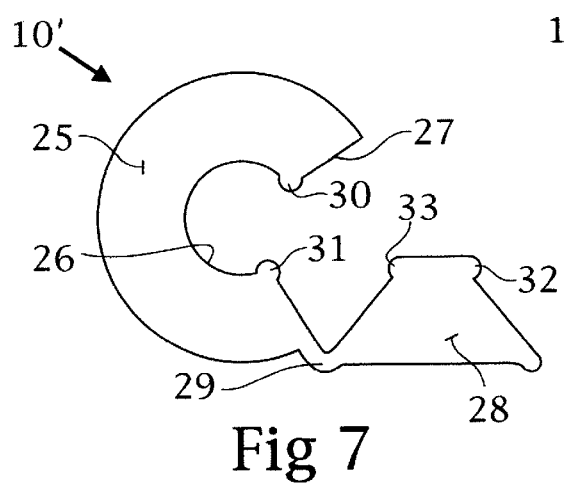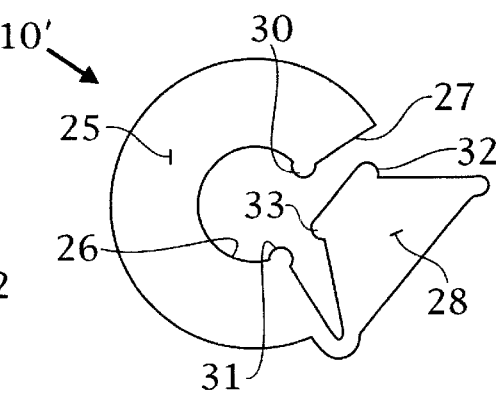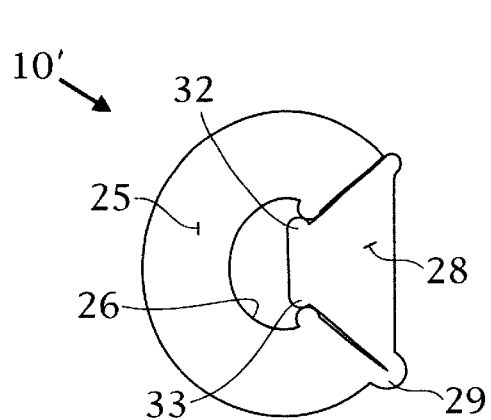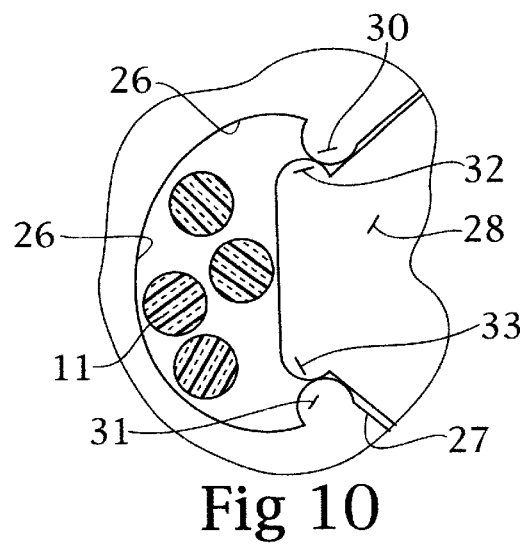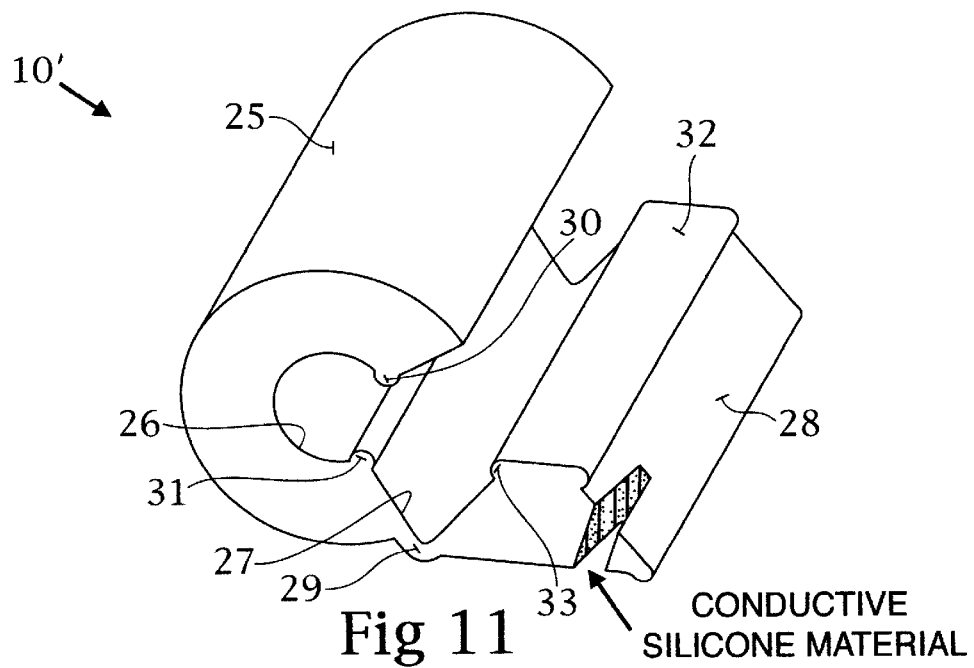

HOLDERS FOR WIRES, SUCH AS FIBER OPTIC WIRES

FIELD OF THE INVENTION

The present invention relates to a holder for wires, and more particularly, to a holder for fiber optic wires.

BACKGROUND OF THE INVENTION

Various holders, clips and other devices have been used in the prior art for retaining wires, cables and other articles. Generally speaking, these prior art devices are not readily adapted for holding fiber optic wires. These fiber optic wires are very thin (basically the diameter of a human hair) and may, for example, run into and out of an epoxy-filled electronic module which is potted and baked. These modules are precision relatively-expensive components. The fiber optic wires emanating therefrom are not readily manipulated into a bundle; as a result, the present commercial practice is to hold these fiber optic wires together with tape (such as "SCOTCH" tape or masking tape) or "VELCRO" fasteners or whatever is readily available to the installer or assembly line worker.

To the best of my knowledge and belief, nothing is readily available on the open market or in the prior art for holding these fiber optic wires together; and this is a distinct disadvantage and deficiency in the art.

BRIEF SUMMARY OF THE INVENTION

Accordingly, it is an object of the present invention to alleviate the disadvantages and deficiencies of the prior art by providing a holder for fiber optic wires which is efficient, relatively low cost, and easy and convenient to use.

In accordance with the teachings of the present invention, a first embodiment thereof is herein illustrated and described, which comprises a unitary molded member having a first portion provided with a recess formed therein, the recess having at least one radially-extending pocket formed therein. A second portion of the unitary molded member has at least one radially-extending protrusion formed thereon, and a substantially-flexible intermediate strap portion connects the first and second portions, respectively, of the unitary molded member. Accordingly, the intermediate strap portion of the unitary molded member may be folded back upon itself to form a loop for retaining the plurality of fiber optic wires therein and transversely thereof In this manner, the second portion of the unitary molded member may be received within the recess formed in the first portion thereof, and the protrusion on the second portion may be received in the pocket on the first portion, such that the second portion is releasably locked to the first portion of the unitary molded member.

Preferably, the recess in the first portion of the unitary molded member comprises a semi-circular recess.

In a preferred embodiment, the semi-circular recess in the first portion of the unitary molded member has a pair of circumferentially-spaced pockets for receiving a respective pair of circumferentially-spaced protrusions on the second portion of the unitary molded member.

Additionally, the first portion of the unitary molded member terminates in a substantially-flat external face provided with an integral protruding flange, thereby facilitating a manual manipulation of the unitary molded member.

Preferably, the unitary molded member is molded from a conductive silicone material.

A second embodiment of the present invention comprises a unitary molded member including a substantially-cylindrical first portion having a bore formed therein and further having a cut-out sector communicating with the bore. This cut-out sector has at least one inwardly-projecting protrusion adjacent to the bore in the first portion of the unitary molded member. The unitary molded member further has a second portion having a substantially trapezoidal cross-section complementary to the cut-out sector in the first portion of the unitary molded member. The second portion of the unitary molded member further has at least one outwardly-projecting protrusion formed thereon. A flexible intermediate portion joins the first and second portions of the unitary molded member. In this manner, the second portion of the unitary molded member may be folded into the first portion of the unitary molded member, such that the second portion is received in the cut-out sector in the first portion, and such that the outwardly-projecting protrusion on the second portion snaps over the inwardly-projecting protrusion on the first portion. As a result, the unitary molded member has a releasably-locked position, and the plurality of fiber optic wires are retained within the bore of the unitary molded member, transversely thereof, in the releasably-locked position of the unitary molded member.

In a preferred embodiment, the cut-out sector of the unitary molded member has a pair of opposed inwardly-projecting protrusions cooperating with a pair of opposed outwardly-projecting protrusions formed on the second portion of the unitary molded member.

Preferably, the intermediate portion of the unitary molded member comprises a "living" hinge.

Like the first embodiment of the present invention, the second embodiment is also molded from a conductive silicone material.

These and other objects of the present invention will become apparent from a reading of the following specification taken in conjunction with the enclosed drawings.

BRIEF DESCRIPTION OF THE DRAWINGS

FIG. 7 is a side elevational view of a second embodiment of the unitary molded member of the present invention, this second embodiment being shown in its unfolded ("natural") shape.

FIG. 8 is a further side elevational view of the unitary molded member of FIG. 7, showing the unitary molded member in the process of being folded back upon itself.

FIG. 9 is a still further side elevational view of the unitary molded member of FIGS. 7 and 8, but showing the unitary molded member in its releasably-locked position.

FIG. 10 is an enlarged portion of FIG. 9, showing the fiber optic wires (in cross-section) being retained within the unitary molded member, transversely thereof.

FIG. 11 is a perspective view of the unitary molded member of FIG. 7, with part broken away and sectioned to show its conductive silicone material.

DESCRIPTION OF THE PREFERRED EMBODIMENTS

Figure 1:
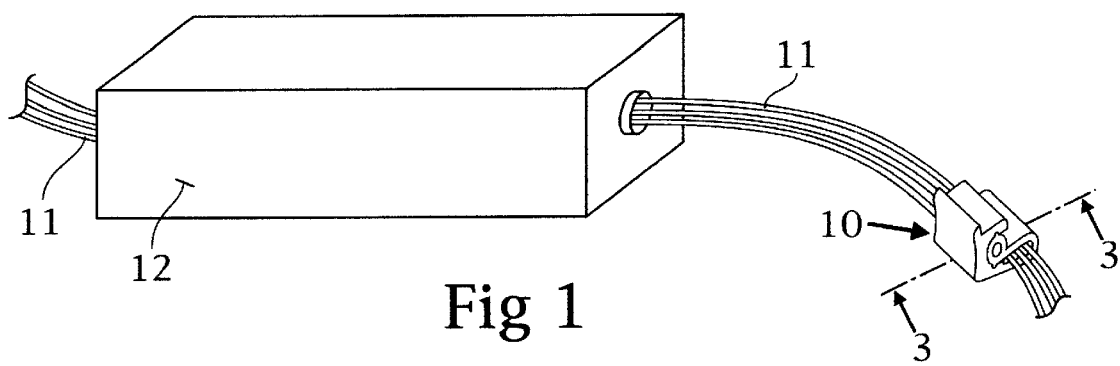
FIG. 1 is a pictorial view of one embodiment of the unitary molded member of the present invention, the unitary molded member retaining a plurality of fiber optic wires emanating from an electronic module (the latter forming no part of the present invention and hence being shown schematically).
Figure 2:
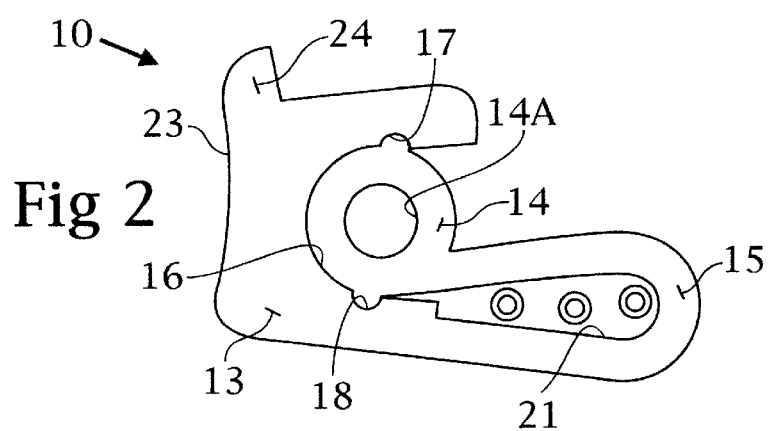
FIG. 2 is an end view of the unitary molded member of FIG. 1, drawn to an enlarged scale, and showing the fiber optic wires being retained in the loop formed when the unitary molded member is folded back upon itself.

With reference to FIG. 1, a first embodiment of the holder of the present invention comprises a unitary molded member 10 retaining a plurality of fiber optic wires 11 connected to an electronic module 12.

With further reference to FIGS. 2–5, the unitary molded member 10 has a first portion 13, a second portion 14, and an intermediate strap portion 15 joining the first and second portions 13 and 14, respectively. The first portion 13 has a substantially semi-circular (semi-cylindrical) recess 16 provided with a pair of circumferentially-spaced pockets 17 and 18, respectively. The second portion 14 of the unitary molded member 10 is substantially circular (that is, cylindrical) and has a pair of circumferentially-spaced protrusions 19 and 20, respectively cooperating with the pockets 17 and 18, respectively, in the recess 16 of the first portion 13, thereby releasably locking the first portion 13 to the second portion 14 of the unitary molded member 10.

Figure 3:
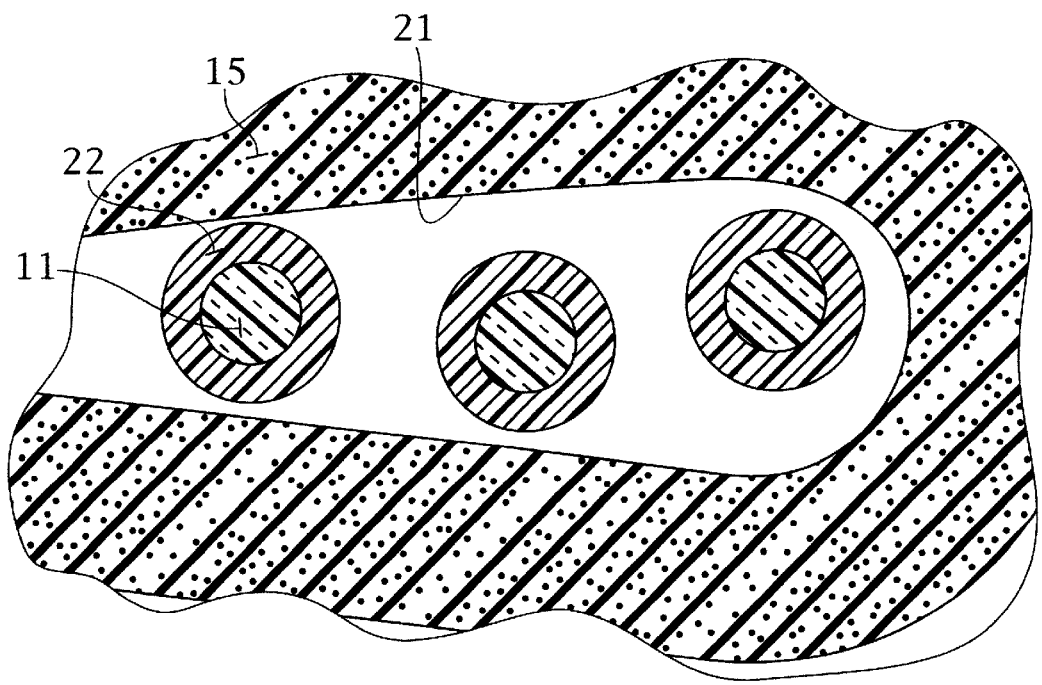
FIG. 3 is a cross-sectional view of the unitary molded member, taken along the lines 3—3 of FIG. 1, and drawn to a substantially enlarged scale.
Figure 4:
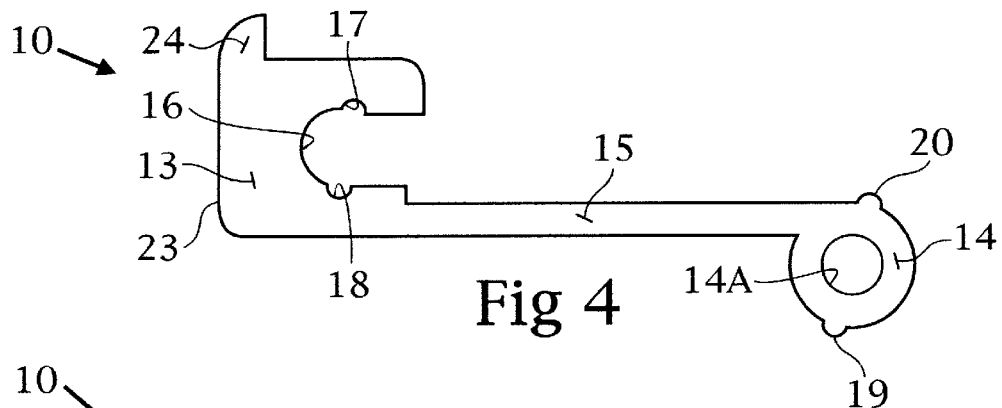
FIG. 4 is a side elevational view of the unitary molded member of FIG. 1 in its unfolded ("natural") shape.
Figure 5:
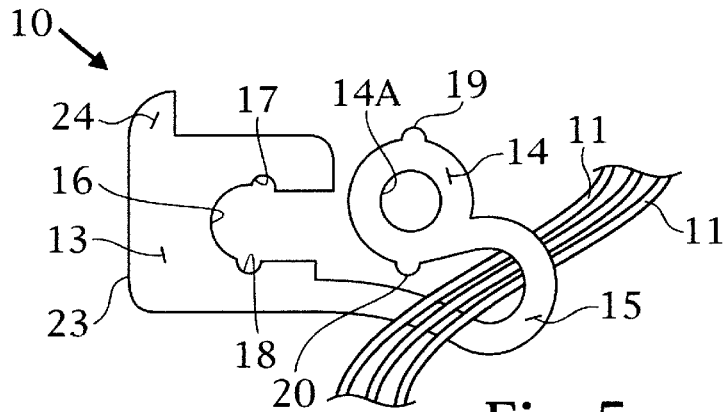
FIG. 5 is a further side elevational view of the unitary molded member of FIG. 4, but showing the flexible intermediate strap portion of the unitary molded member being partially folded back upon itself (for retaining the fiber optic wires within the loop being formed).

In this locked position of the unitary molded member 10, the intermediate strap portion 15 forms a loop 21 (see FIGS. 2 and 3) for retaining the fiber optic wires 11. As shown in FIG. 3, the fiber optic wires 11 (in this instance) are provided with respective jackets 22.

Figure 6:
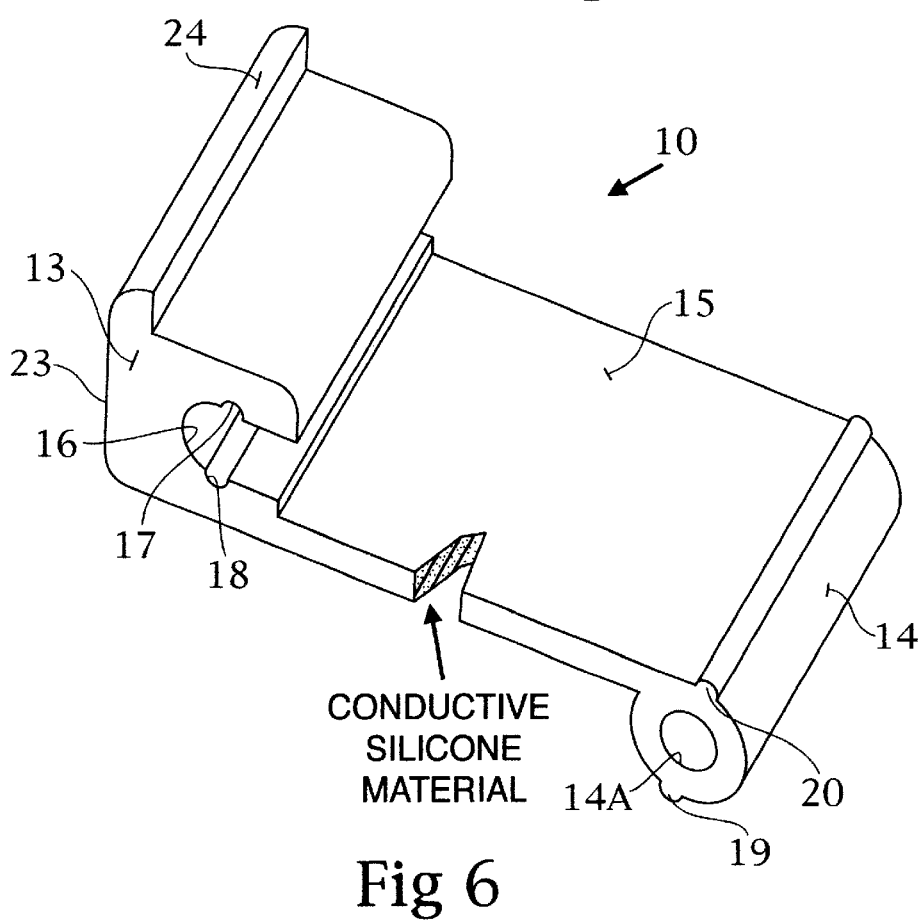
FIG. 6 is a perspective view of the unitary molded member of FIG. 1, part of which is broken away and sectioned to show the conductive silicone material.

With reference again to FIG. 3 and with further reference to FIG. 6, the unitary molded member 10 is preferably molded from a conductive silicone material for improved anti-static performance which is desirable in the fiber optic industry.

The first portion 13 of the unitary molded member 10 has a substantially flat face 23 provided with an extending flange 24. The flange 24 facilitates manual manipulation of the unitary molded member 10.

It will be understood that the unitary molded member 10 is wrapped around the fiber optic wires 11 transversely thereof; that is, the fiber optic wires 11 may be laid on the intermediate strap portion 15, and then the unitary molded member 10 is folded back upon itself (forming the loop 21) and is then "snapped" into place in its releasably locked position, thereby "trapping" the fiber optic wires 11 in the loop 21. Conversely, the unitary molded member 10 may be unfolded by manually pulling it apart (or by using a suitable tool, if necessary) so that the loop 21 is unfolded and the fiber optic wires 11 are released.

Since the unitary molded member 10 is molded from a material which is somewhat flexible or pliable, the unitary molded member 10 will become somewhat distorted in its releasably locked position. This is shown more clearly in FIG. 2.

The second portion 14 of the unitary molded member 10 may have a bore 14A to make the second portion more flexible and hence facilitate the "snap fit" of the second portion 14 into the first portion 13 of the unitary molded member 10.

With reference to FIGS. 7–11, a second embodiment of the present invention comprises a unitary molded members 10' having a first portion 25 which is generally cylindrical and has a bore 26 communicating with a cut-out sector portion 27. The unitary molded member 10' has a second portion 28 which, preferably, is generally trapezoidal in cross-section and is complementary to the cut-out sector 27; and the unitary molded member 10' further has an intermediate "living" hinge portion 29 connecting the first and second portions 25 and 28, respectively.

The first portion 25 of the unitary molded member 10' has (at least one) and preferably a pair of inwardly-projecting protrusions (or "bumps") 30 and 31, respectively, between the bore 26 and the cut-out portion 27. The second portion 28 of the unitary molded member 10', in turn, has at least one and preferably a pair of outwardly-projecting protrusions (or "bumps") 32 and 33, respectively, which cooperate with the inwardly-projecting protrusions 30 and 31, respectively, on the first portion 25 of the unitary molded member 10'. When the second portion 28 is folded into the first portion 25 (see FIGS. 8 and 9) the protrusions 32 and 33 on the second portion 28 ride over the respective protrusions 30 and 31 on the first portion 25; and the second portion 28 is thus "snapped" into the first portion 25 of the unitary molded member 10'. This is the removably locked position of the unitary molded member 10' as shown in FIGS. 9 and 10. The unitary molded member 10' is relatively flexible and thus may be somewhat distorted as the protrusions 32 and 33 slide over and crimp or deform the protrusions 30 and 31, respectively.

With reference again to FIG. 10, the fiber optic wires 11' are retained in the bore 26 of the first portion 25 of the unitary molded member 10', transversely thereof. In this embodiment, the fiber optic wires 11' may be of the non-jacketed type.

With reference to FIG. 11, the unitary molded member 10' (like the unitary molded member 10) is also preferably molded from a conductive silicone material.

The inherent utility and advantages of the present invention are applicable to other environments (other than fiber optic wires) and the unitary molded members 10 and 10', respectively, may be scaled up (or down) in size for various product applications.

Figure 12:
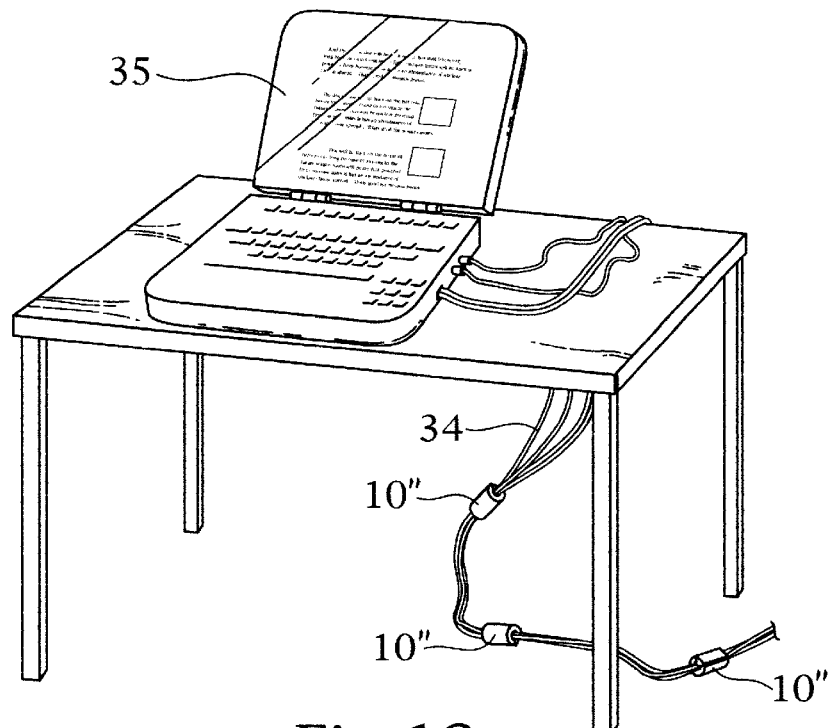
FIG. 12 is a pictorial view, showing how the present invention (in this instance, the second embodiment of the invention) may be used to retain the cables of a laptop computer, it being understood that the holder is substantially enlarged in scale.
Figure 13:
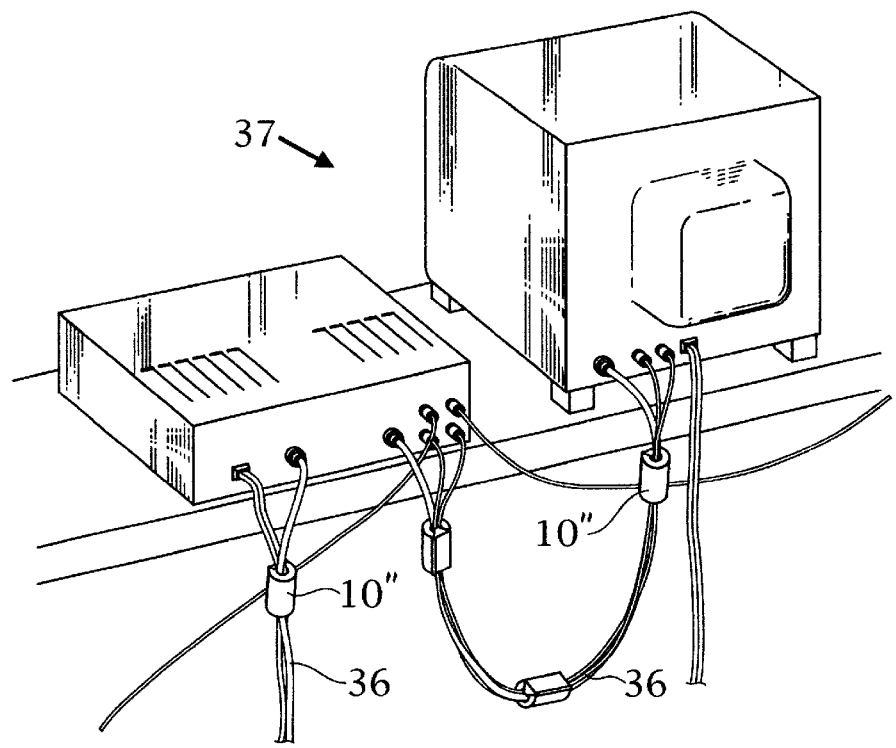
FIG. 13 is a further pictorial view, showing the application of the teachings of the present invention to the cables of a personal computer (PC).

Accordingly, in FIG. 12, several unitary molded members 10" (a scaled-up version of the cylindrical unitary molded member 10' of FIGS. 7 and 8) may be used to neatly retain the cables 34 of a laptop computer 35; and in FIG. 13, several cylindrical unitary molded members 10" may be used to neatly retain the cables 36 of a personal computer (PC) 37. Other uses may be made of the unitary molded members of the present invention.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A holder for retaining a plurality of fiber optic wires, comprising a unitary molded member molded from a conductive silicone material, the unitary molded member having a first portion provided with a recess formed therein, a second portion having a pair of circumferentially-spaced radially-extending protrusions formed thereon, and a third intermediate flexible portion connecting the first and second portions, such that the second portion of the unitary molded member may be folded back upon itself, and such that the circumferentially-spaced radially-projecting protrusions on the second portion of the unitary molded member may be received within the recess in the first portion of the unitary molded member, thereby releasably retaining the first and second portions of the unitary molded member together, such that the unitary molded member has a folded releasably-locked position, and means for retaining the plurality of fiber optic wires in the releasably-locked position of the unitary molded member, transversely thereof.

2. A holder for retaining a plurality of fiber optic wires, comprising a unitary molded member having a first portion provided with a recess formed therein, the recess having at least one radially-extending pocket formed therein, a second portion having at least one radially-extending protrusion formed thereon, and a substantially-flexible intermediate strap portion connecting the first and second portions, respectively, such that the intermediate strap portion of the unitary molded member may be folded back upon itself to form a loop for retaining the plurality of fiber optic wires therein and transversely thereof, such that the second portion of the unitary molded member may be received within the recess formed in the first portion thereof, and such that the protrusion on the second portion may be received in the pocket on the first portion, such that the second portion is releasably locked to the first portion of the unitary molded member.

3. The holder of claim 2, wherein the recess in the first portion of the unitary molded member comprises a semi-circular recess.

4. The holder of claim 3, wherein the semi-circular recess in the first portion of the unitary molded member has a pair of circumferentially-spaced pockets for receiving the respective pair of circumferentially-spaced protrusions on the second portion of the unitary molded member.

5. The holder of claim 4, wherein the first portion of the unitary molded member terminates in a substantially-flat external face, and wherein the substantially-flat external face is provided with an integral protruding flange, thereby facilitating a manual manipulation of the unitary molded member.

6. The holder of claim 2, wherein the unitary molded member is molded from a conductive silicone material.

7. A holder for retaining a plurality of fiber optic wires, comprising a unitary molded member molded from a conductive silicone material and having a first portion provided with a semi-circular recess formed therein, the recess having a pair of radially-extending pockets formed therein, a second portion having a pair of radially-extending protrusions formed thereon, and a substantially-flexible intermediate strap portion connecting the first and second portions, respectively, such that the intermediate strap portion of the unitary molded member may be folded back upon itself to form a loop for retaining the plurality of fiber optic wires therein and transversely thereof, such that the second portion of the unitary molded member may be received within the recess formed in the first portion thereof, and such that the protrusion on the second portion may be received in the pocket on the first portion, such that the second portion is releasably locked to the first portion of the unitary molded member, and the first portion of the unitary molded member having a substantially external flat face provided with an integral protruding flange, thereby facilitating a manual manipulation of the unitary molded member.

8. A holder for retaining a plurality of wires or cables, comprising a unitary molded member having a first portion provided with a semi-circular recess formed therein, the recess having a pair of radially-extending pockets formed therein, a second portion having a pair of radially-extending protrusions formed thereon, and a substantially-flexible intermediate strap portion connecting the first and second portions, respectively, such that the intermediate strap portion of the unitary molded member may be folded back upon itself to form a loop for retaining the plurality of wires or cables therein and transversely thereof, such that the second portion of the unitary molded member may be received within the recess formed in the first portion thereof, and such that the protrusion on the second portion may be received in the pocket on the first portion, such that the second portion is releasably locked to the first portion of the unitary molded member.

9. A holder for retaining a plurality of fiber optic wires, comprising a unitary molded member including a substantially-cylindrical first portion having a bore formed therein and further having a cut-out sector communicating with the bore, the cut-out sector having at least one inwardly-projecting protrusion adjacent to the bore in the first portion of the unitary molded member, the unitary molded member further having a second portion having a substantially trapezoidal cross-section complementary to the cut-out sector in the first portion of the unitary molded member, the second portion of the unitary molded member further having at least one outwardly-projecting protrusion, and a flexible intermediate portion joining the first and second portions of the unitary molded member, such that the second portion of the unitary molded member may be folded into the first portion of the unitary molded member, such that the second portion is received in the cut-out sector in the first portion, and such that the outwardly-projecting protrusion on the second portion snaps over the inwardly-projecting protrusion on the first portion, such that the unitary molded member has a releasably-locked position, and the plurality of fiber optic wires being retained within the bore of the unitary molded member, transversely thereof, in the releasably-locked position of the unitary molded member.

10. The holder of claim 9, wherein the cut-out sector of the unitary molded member has a pair of opposed inwardly-projecting protrusions cooperating with a pair of opposed outwardly-projecting protrusions formed on the second portion of the unitary molded member.

11. The holder of claim 9, wherein the intermediate portion of the unitary molded member comprises a "living" hinge.

12. The holder of claim 9, wherein the unitary molded member is molded from a conductive silicone material.

13. A holder for retaining a plurality of fiber optic wires, comprising a unitary molded member molded from a conductive silicone material and including a substantially-cylindrical first portion having a bore formed therein and further having a cut-out sector communicating with the bore, the cut-out sector having a pair of inwardly-projecting protrusions adjacent to the bore in the first portion of the unitary molded member, the unitary molded member further having a second portion having a substantially trapezoidal cross-section complementary to the cut-out sector in the first portion of the unitary molded member, the second portion of the unitary molded member further having a pair of outwardly-projecting protrusions, and a flexible intermediate portion comprising a "living" hinge joining the first and second portions of the unitary molded member, such that the second portion of the unitary molded member may be folded into the first portion of the unitary molded member, such that the second portion is received in the cut-out sector in the first portion, and such that the outwardly-projecting protrusions on the second portion snap over the inwardly-projecting protrusions on the first portion, such that the unitary molded member has a releasably-locked position, and the plurality of fiber optic wires being retained within the bore of the unitary molded member, transversely thereof, in the releasably-locked position of the unitary molded member.

14. A holder for retaining a plurality of wires or cables, comprising a unitary molded member including a substantially-cylindrical first portion having a bore formed therein and further having a cut-out sector communicating with the bore, the cut-out sector having a pair of inwardly-projecting protrusions adjacent to the bore in the first portion of the unitary molded member, the unitary molded member further having a second portion having a substantially trapezoidal cross-section complementary to the cut-out sector in the first portion of the unitary molded member, the second portion of the unitary molded member further having a pair of outwardly-projecting protrusions, and a flexible intermediate portion comprising a "living" hinge joining the first and second portions of the unitary molded member, such that the second portion of the unitary molded member may be folded into the first portion of the unitary molded member, such that the second portion is received in the cut-out sector in the first portion, and such that the outwardly-projecting protrusions on the second portion snap over the inwardly-projecting protrusions on the first portion, such that the unitary molded member has a releasably-locked position, and the plurality of wires or cables being retained within the bore of the unitary molded member, transversely thereof, in the releasably-locked position of the unitary molded member.

* * * * *